(12) United States Patent
Schumacher

(10) Patent No.: US 6,929,102 B1
(45) Date of Patent: Aug. 16, 2005

(54) METHOD FOR ACTUATING A WHEEL BRAKE DEVICE

(75) Inventor: Axel Schumacher, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 363 days.

(21) Appl. No.: 10/019,269

(22) PCT Filed: Jun. 23, 2000

(86) PCT No.: PCT/DE00/02056

§ 371 (c)(1),
(2), (4) Date: Dec. 28, 2001

(87) PCT Pub. No.: WO01/03989

PCT Pub. Date: Jan. 18, 2001

(30) Foreign Application Priority Data

Jul. 8, 1999 (DE) ................................ 199 31 821

(51) Int. Cl.$^7$ ............................................. F16D 65/38
(52) U.S. Cl. ............................ 188/196 R; 188/196 C; 188/71.8; 188/79.51; 188/162
(58) Field of Search ............... 188/158, 72.1, 188/72.8, 162, 156, 72.7, 171, 72.3, 196 R, 188/196 A, 196 C, 71.8, 79.51; 303/158

(56) References Cited

U.S. PATENT DOCUMENTS

| | | | | |
|---|---|---|---|---|
| 4,399,894 A | * | 8/1983 | Tribe ......................... | 188/71.9 |
| 5,090,518 A | * | 2/1992 | Schenk et al. ............. | 188/72.1 |
| 5,219,048 A | * | 6/1993 | Shaw et al. ................ | 188/72.1 |
| 5,348,123 A | * | 9/1994 | Takahashi et al. ......... | 188/72.1 |
| 5,454,630 A | * | 10/1995 | Zhang ........................ | 303/175 |
| 5,931,268 A | * | 8/1999 | Kingston et al. ........... | 188/162 |
| 6,311,807 B1 | * | 11/2001 | Rinsma ..................... | 188/71.9 |

FOREIGN PATENT DOCUMENTS

| | | |
|---|---|---|
| DE | 42 29 042 A | 3/1993 |
| DE | 198 44 840 A | 4/2000 |

* cited by examiner

*Primary Examiner*—Matthew C. Graham
*Assistant Examiner*—Mariano Sy
(74) *Attorney, Agent, or Firm*—Ronald E. Greigg

(57) ABSTRACT

The invention relates to a method for actuating a wheel brake assembly, in particular an electromechanical wheel brake assembly (10) or a mechanical system involving friction and having spring elasticity. To increase a braking force once a quasi-static terminal state of the wheel brake assembly (10) is reached, the invention proposes actuating the wheel brake assembly (10) for a brief period of time in the release direction and then to re-tighten it; the period of time of the actuation in the release direction is selected to be so brief that the braking force is reduced, if at all, only imperceptibly.

18 Claims, 2 Drawing Sheets

METHOD FOR ACTUATING A WHEEL BRAKE DEVICE

CROSS-REFERENCE TO RELATED APPLICATIONS

This application is a 35 USC 371 application of PCT/DE 00/02056 filed on Jun. 23, 2000.

BACKGROUND OF THE INVENTION

1. Field of the Invention

The invention relates to a method for actuating a wheel brake assembly, in particular an electromechanical wheel brake assembly or a mechanical system involving friction and having spring elasticity.

2. Description of the Prior Art

For the sake of clear illustration, the invention will be explained below concretely in terms of the actuation of an electromechanical wheel brake assembly. However, the invention is not intended to be limited to electromechanical wheel brake assemblies; for instance, the method of the invention is applicable to hydraulic or pneumatic wheel brake assemblies, especially if they are actuated by external force, and generally to mechanical systems involving friction and having spring elasticity.

Electromechanical wheel brake assemblies are known per se. For example, see German Patent Disclosure DE 42 29 042 A1. The known electromechanical wheel brake assemblies have an electric motor, whose rotary motion is transmitted by a gear to a rotation/translation conversion gear, typically a spindle drive, with which a friction brake lining can be pressed (tightening) against a brake body, connected in a manner fixed against relative rotation to a vehicle wheel, such as a brake disk or a brake drum, and lifted again (releasing). To convert the rotary motion of the electric motor into a translational motion for exerting pressure on the brake lining, a cam can for instance also be used. It is also known to embody a rotor of the electric motor as a nut of the spindle drive and to dispense with the gear between the electric motor and the spindle drive.

For braking, in the known electromechanical wheel brake assemblies the electric motor is supplied with current in the tightening direction, until a desired a braking force is reached. The braking force can be increased until such time as a quasi-static terminal state is attained, at which a torque of the electric motor, at maximum current supply, no longer suffices to increase the contact pressure of the friction brake lining against the brake body any further.

SUMMARY OF THE INVENTION

The method of the invention has the advantage that the braking force of the wheel brake assembly can be increased beyond the value that it has in the quasi-static terminal state, and the braking action is improved substantially.

Another advantage of the method of the invention is that it requires no external measurement or input signals, such as the braking force exerted by the wheel brake assembly, in order to be performed. Sensors that measure the contact pressure of the friction brake lining at the brake body, or perform similar actions, can therefore be omitted. The method of the invention can be employed in an existing and in particular electromechanical wheel brake assembly, without having to make such modifications as mounting a sensor on the wheel brake assembly.

In fading as well, that is, when the braking force of the wheel brake assembly fades as a consequence of overheating, the method of the invention can be employed to advantage to regain or even exceed the braking force that existed before the fading occurred.

The invention is based on the following concept: The wheel brake assembly is not absolutely rigid; even when embodied stiffly, it has some elasticity, against which the electric motor tightens the wheel brake assembly. The electric motor upon tightening must also overcome friction, for instance of the gear and the spindle drive, and because of the increasing forces, this friction load increases as the tightening increases. At a high tightening force, the friction load is high; that is, a not insignificant proportion of the torque of the electric motor is consumed to overcome the friction, and only the torque of the electric motor beyond that proportion increases the tightening force further. When the quasi-static terminal state is reached, the moving parts of the wheel brake assembly come to a stop, and the friction changes into static friction, which is higher. A further increase in the braking force would be possible then only if the torque of the electric motor could be increased so far that the static friction is overcome, and that the moving parts of the wheel brake assembly move again.

Since the torque of the electric motor cannot be increased arbitrarily, in the method of the invention a different course has been taken: To increase the braking force further once the quasi-static terminal state has been reached, the wheel brake assembly is actuated for a brief period of time in the release direction and then re-tightened. By the actuation in the release direction, and specifically with reinforcement from the elasticity of the wheel brake assembly rather than counter to the elasticity, the static friction is overcome, and the moving parts of the wheel brake assembly are put into motion again. After that, the wheel brake assembly is tightened again, and the braking force is greater than in the quasi-static terminal state, since the static friction need not be overcome; instead, the electric motor operates counter to the lesser sliding friction. The method can be repeated multiple times, in order to increase the braking force further in increments. In experiments, it was possible to increase the braking force by approximately one-third compared to the value in the quasi-static terminal state.

For actuating the wheel brake assembly in the release direction, the electric motor need not necessarily be supplied with current in the release direction; often, it suffices to interrupt its current supply or reduce it, before the electric motor is again acted upon with maximum current supply in the tightening direction in order to re-tighten the wheel brake assembly. Nor is the wheel brake assembly actually released; instead, the actuation in the release direction is so brief that the braking force is reduced, if at all, only imperceptibly. It is not the goal of the invention to reduce the braking force of the wheel brake assembly temporarily and then increase it again; instead, by actuating the wheel brake assembly in the release direction, any stresses in bearings, gears, guides and the like, which can occur in the quasi-static terminal state because of the high tightening force of the wheel brake assembly, are meant to be reversed, and the static friction is to be overcome. An explanation for why the braking force of the wheel brake assembly does not decrease despite a brief actuation in the release direction could be hysteresis resulting from the elasticity of the wheel brake assembly. In any case, in experiments, no loss of braking force during the brief actuation of the wheel brake assembly in the release direction was measurable. This can be due to the fact either that the braking force in fact did not decrease, or that the decrease in braking force was less than the measurement precision and hence was insignificant. A perceptible reduction in the braking force during the actuation of the wheel brake assembly in the release direction would be quite worrisome to a driver and would moreover lengthen the braking distance, which should be avoided and is unwanted according to the invention. What is meant by the expression that the braking force is reduced if at all only imperceptibly is that the wheel brake assembly is actuated in the release direction only so briefly that any stresses in the drive of the wheel brake assembly will be reversed and the static friction will change into a sliding friction.

The method of the invention can also be adopted for other mechanical systems involving friction and having spring elasticity and is not limited to wheel brake assemblies. The above explanations on the wheel brake assembly, in particular on the electromechanical wheel brake assembly, logically apply here as well and will not be repeated at this point.

For increasing the braking force incrementally, the method according to the invention is repeated multiple times. The method is repeated after a predetermined time after the onset of the re-tightening. This has the advantage that there is no need to determine or wait for whether the wheel brake assembly, after being re-tightened, has already come to a stop. The method is repeated if the wheel brake assembly/the system upon re-tightening has come to a stop or at least is virtually at a stop. In this way, each time the method is repeated a maximum increase in the braking force, or in the force exerted by the spring-elastic mechanical system that involves friction is attained.

Since the braking force, or the force exerted by the system, cannot be increased arbitrarily by the method of the invention but instead seeks to meet a limit value, the number of repetitions is limited.

According to one aspect of the invention, a distance that an actuating element of the wheel brake assembly covers in its actuation in the release direction is used as a standard for the actuation in the release direction. If the actuating element has traveled a fixed distance in the release direction, then the wheel brake assembly/the system is re-tightened. The travel of the actuating element in the release direction accordingly determines the brief period of time during which the wheel brake assembly/the system is actuated in the release direction. In this case, no time is measured. The actuating element can for instance be a rotor of the electric motor of the wheel brake assembly, which is rotated backward by a predetermined angle in order to actuate the wheel brake assembly in the release direction.

BRIEF DESCRIPTION OF THE DRAWINGS

The invention will be described in further detail below in terms of an exemplary embodiment shown in the drawings, in which.

DESCRIPTION OF THE PREFERRED EMBODIMENT

Figure 1:
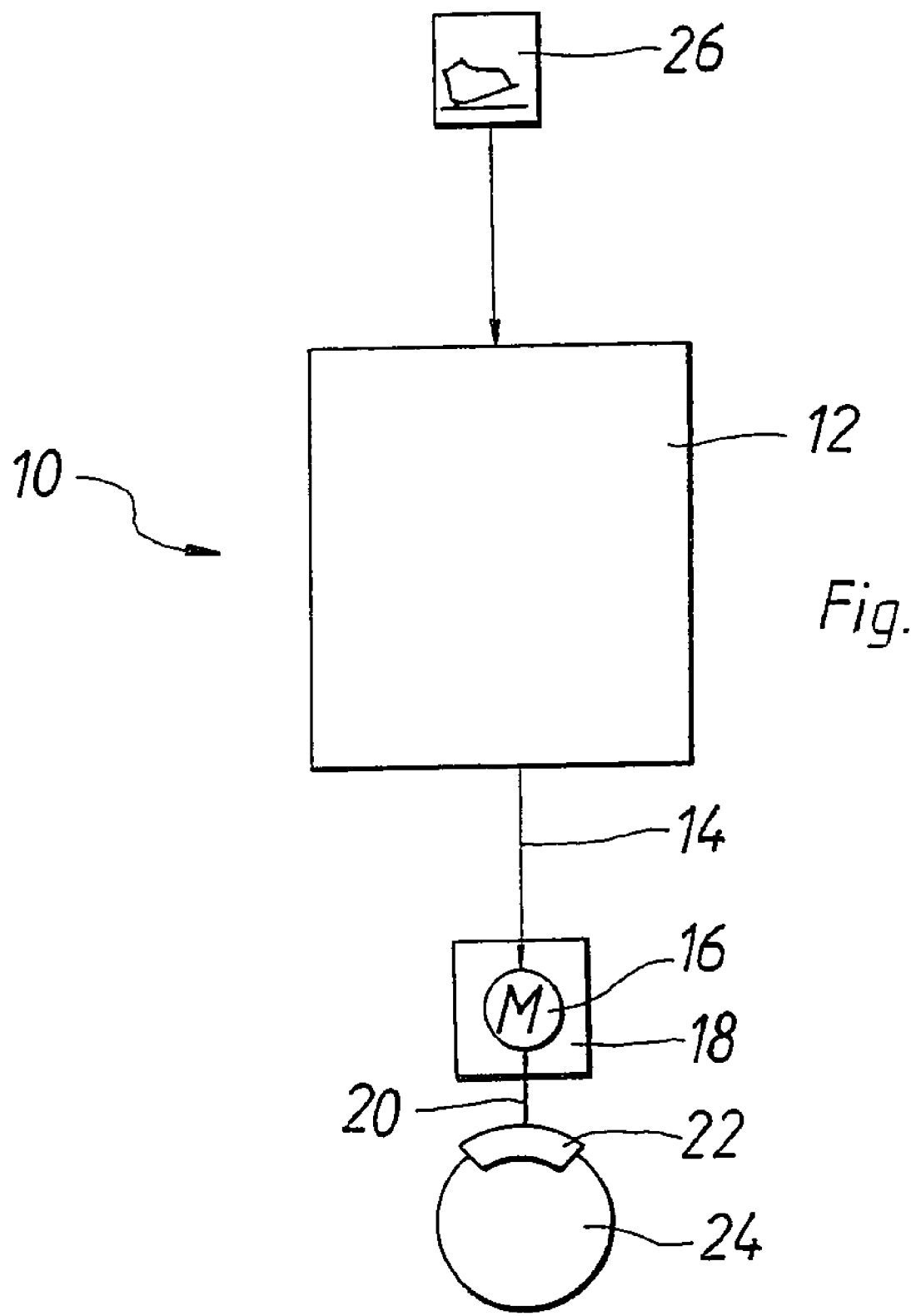
FIG. 1 is an overview of an electromechanical wheel brake assembly.

FIG. 1 shows an overview of an electromechanical wheel brake assembly 10, known per se. Reference numeral 12 indicates an electronic control unit, which via an output line 14 controls an electric motor 16. The electric motor 16 is part of a brake actuator 18, which via a mechanical connection 20 actuates a brake device 22, with which a brake body 24, such as a brake disk, which is connected to a vehicle wheel, not shown, in a manner fixed against relative rotation can be braked. As its input signal, the control unit 12 receives a signal of a brake pedal sensor 26, which measures a force by which a brake pedal is depressed, or a travel distance by which the brake pedal is depressed.

In an experimental setup, not shown, for performing the method of the invention, the wheel brake assembly 10 had a plate wheel gear, which was drivable with the electric motor 16 and whose plate wheel was mounted in a manner fixed against relative rotation on a nut of a spindle drive. The plate wheel gear and the spindle drive form the brake actuator 18. With a spindle of the spindle drive, a friction brake lining located in a brake caliper could be pressed against a brake disk 24 of the wheel brake assembly, embodied as a disk brake assembly. The spindle forms the mechanical connection 20, while the brake caliper forms the brake device 22. Because of the elasticity, especially of the brake caliper but also of the other components of the wheel brake assembly, that exist even in a rigid design, the mechanical connection 20 can be thought of as a spring element.

Upon the usual actuation of the wheel brake assembly 10, as a function of what the driver wants, the electric motor 16 is supplied with current in a tightening device until such time as a braking force dependent on what the driver wants is reached. The maximum attainable braking force occurs when the electric motor 16 is subjected to a maximum current supply. It tightens the wheel brake assembly 10 until its torque no longer suffices to increase the tightening force further. This is the so-called quasi-static terminal state.

If the braking force is to be increased further, then according to the invention the wheel brake assembly 10 is actuated for a brief period of time in the release direction; for this purpose, it can suffice to interrupt the current supply to the electric motor 16 briefly, and there is no absolute necessity of supplying current to the electric motor 16 in the release direction. Next, the electric motor 16 is again supplied with maximum current in the tightening direction. By the brief actuation of the wheel brake assembly 10 in the release direction, any stresses existing in the brake actuator 18 because of the high tightening force have gone away, and a static friction, which ensues because of the stoppage of the wheel brake assembly 10 once the quasi-static terminal state has been reached, has been overcome, specifically by utilizing the elasticity of the wheel brake assembly 10. In the ensuing re-tightening, an increased braking force is thereby attained, which is beyond that of the quasi-static terminal state. The period of time for actuating the wheel brake assembly 10 in the release direction is selected to be so brief that the braking force is either not reduced, or at most is reduced imperceptibly.

For increasing the braking force further in increments, the method of the invention is repeated. The repetition can be done when the electric motor 16 and the brake actuator 18, upon re-tightening, are completely at a stop or nearly at a stop. The repetition of the method can also be done after a fixedly defined period of time, which can end even before the stoppage of the electric motor 16 and the brake actuator 18 upon re-tightening.

Even if the braking force of the wheel brake assembly 10 fades, for instance because of overheating (fading) during braking, by application of the method of the invention the braking force can be restored to its original value or even increased beyond it. The use of the method of the invention is not limited to electromechanical wheel brake assemblies;

in particular, it can also be used for electrohydraulic or electropneumatic brake systems. The method of the invention is furthermore not limited to wheel brake assemblies; it can also be adopted in other mechanical systems involving friction and having spring elasticity.

A preferred realization of the method of the invention is for it to be implemented as a program in a microcomputer of the control unit 12.

Figure 2:
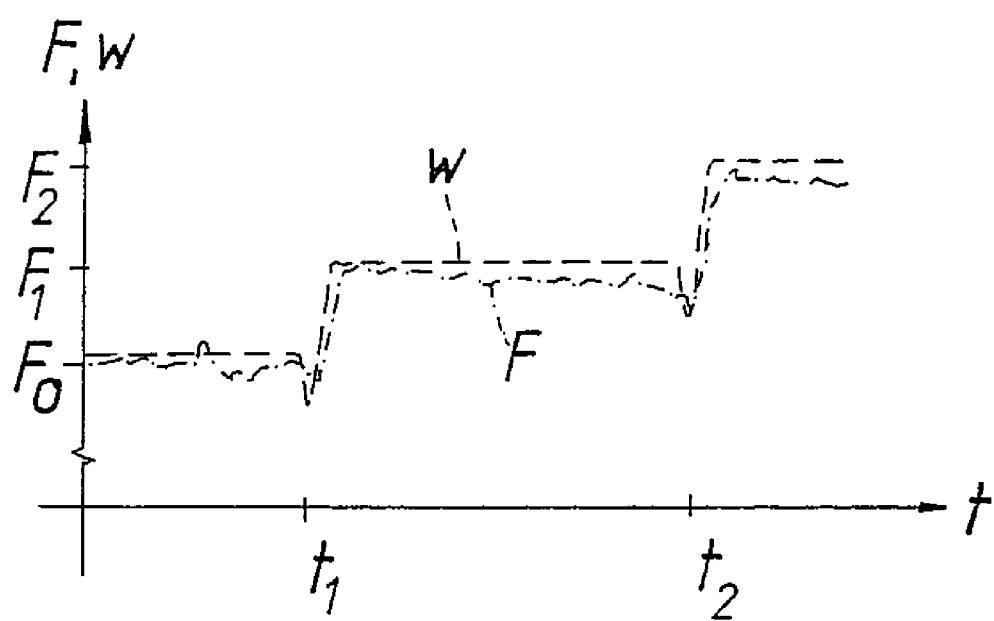
FIG. 2 is a timing graph to illustrate the mode of operation of the method of the invention.

The course of the method of the invention can be seen from the timing graph in FIG. 2. Here the course of the contact pressure F of a friction brake lining against the brake disk 24 is represented by a dot-dashed line, and a rotational angle w of a rotor of the electric motor 16 is plotted with a dashed line, both over the time t. The electromechanical wheel brake assembly 10 used in the experimentation has been described above at the beginning of the description of the exemplary embodiment. $F_0$ indicates the contact pressure of the friction brake lining against the brake disk at maximum current supplied to the electric motor 16, that is, in the quasi-static terminal state of the wheel brake assembly 10. To increase the contact pressure F further, in the experiment described the rotor of the electric motor 16 is rotated backward at time $T_1$ by an angle of approximately 15° in the release direction, and then the electric motor 16 was supplied with current again in the tightening direction. As shown in FIG. 2, upon re-tightening, the rotor of the electric motor 16 rotates past its position in the quasi-static terminal state; the contact pressure F also increases in stages to a value $F_1$, which is greater than the contact pressure $F_0$ in the quasi-static terminal state. At time $T_2$, the rotor of the electric motor 16 has been rotated in reverse by 15° again, and then the electric motor has been subjected to maximum current supply once again, as a result of which the rotor has rotated onward again and the contact pressure F has been increased further to the value $F_2$. By repetition of the method, the contact pressure F can be increased by approximately one-third, compared to the contact pressure $F_0$ in the quasi-static terminal state of the wheel brake assembly 10. The period of time of the reverse rotation of the rotor by 15° and of the ensuing forward rotation past the original position was approximately 15 ms, and the chronological spacing between two repetitions was approximately 0.15 to 0.2 seconds.

The foregoing relates to preferred exemplary embodiments of the invention, it being understood that other variants and embodiments thereof are possible within the spirit and scope of the invention, the latter being defined by the appended claims.

I claim:

1. A method for actuating a wheel brake assembly comprising the steps of (a) initially actuating the brake assembly in a tightening direction to cause a brake lining to be pressed against a brake body to establish a quasi-static terminal braking state, then (b) actuating the wheel brake assembly (10) for a brief period of time in a release direction opposite to the tightening direction, and then (c) again actuating the brake assembly in the tightening direction, said brief period of time of the actuation in the release direction being selected to be so short that any reduction of the braking force is imperceptible.

2. The method of claim 1 further comprising repeating steps (b) and (c).

3. The method of claim 2, wherein steps (b) and (c) are repeated after a predetermined period of time after the onset of the re-tightening.

4. The method of claim 2, wherein steps (b) and (c) are repeated when the wheel brake assembly (10) comes to a stop upon re-tightening.

5. The method of claim 2, wherein number of repetitions of steps (b) and (c) is limited.

6. The method of claim 1 wherein said brief period of time during which the wheel brake assembly (10) is actuated in the release direction is defined by a travel distance by which an actuating element of the wheel brake assembly (10) is moved in the release direction.

7. A method for actuating a mechanical system involving friction and having a spring elasticity to increase a force exerted by the system beyond a force attainable in a quasi-static state, the method comprising the steps of (a) actuating the system for a brief period of time in a release direction and then (b) tightened, the period of time of the actuation in the release direction being selected to be so short that any reduction of the force exerted is imperceptible.

8. The method of claim 7 further comprising repeating steps (a) and (b).

9. The method of claim 8, wherein steps (a) and (b) are repeated after a predetermined period of time after the onset of the re-tightening.

10. The method of claim 8, wherein steps (a) and (b) are repeated when the system (10) comes to a stop upon re-tightening.

11. The method of claim 8, wherein number of repetitions of steps (a) and (b) is limited.

12. The method of claim 7 wherein said brief period of time during which the system (10) is actuated in the release direction is defined by a travel distance by which an actuating element of the system (10) is moved in the release direction.

13. A method for actuating an electromechanical wheel brake assembly having an electric motor, a brake actuator and means connecting the electric motor to the brake actuator for converting rotary motion of the electric motor into a translational motion, the method comprising the steps of (a) initially actuating the electric motor in a tightening direction to cause the brake actuator to be pressed against a brake body to establish a quasi-static terminal braking state, then (b) actuating the electric motor for a brief period of time in a release direction opposite to the tightening direction, and then (c) again actuating the electric motor in the tightening direction, said brief period of time of the actuation in the release direction being selected to be so short that any reduction of the braking force is imperceptible.

14. The method of claim 13 further comprising repeating steps (b) and (c).

15. The method of claim 14, wherein steps (b) and (c) are repeated after a predetermined period of time after the onset of the re-tightening.

16. The method of claim 14, wherein steps (b) and (c) are repeated when the wheel brake assembly comes to a stop upon re-tightening.

17. The method of claim 14, wherein number of repetitions of steps (b) and (c) is limited.

18. The method of claim 13 wherein said brief period of time during which the electric motor is actuated in the release direction is defined by a travel distance by which the electric motor is moved in the release direction.

* * * * *